United States Patent
Aiba et al.

(10) Patent No.: US 12,364,935 B2
(45) Date of Patent: Jul. 22, 2025

(54) APPARATUS FOR PRODUCING NON-AQUEOUS ELECTROLYTIC SOLUTION AND METHOD FOR PRODUCING NON-AQUEOUS ELECTROLYTIC SOLUTION

(71) Applicant: ORGANO CORPORATION, Tokyo (JP)

(72) Inventors: Kenta Aiba, Tokyo (JP); Akira Nakamura, Tokyo (JP); Miwa Ito, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 665 days.

(21) Appl. No.: 17/284,241

(22) PCT Filed: Sep. 27, 2019

(86) PCT No.: PCT/JP2019/038123
§ 371 (c)(1),
(2) Date: Apr. 9, 2021

(87) PCT Pub. No.: WO2020/075529
PCT Pub. Date: Apr. 16, 2020

(65) Prior Publication Data
US 2021/0354050 A1  Nov. 18, 2021

(30) Foreign Application Priority Data

Oct. 11, 2018  (JP) .................................. 2018-192300

(51) Int. Cl.
*B01D 15/18* (2006.01)
*B01D 15/36* (2006.01)
(Continued)

(52) U.S. Cl.
CPC ....... *B01D 15/1871* (2013.01); *B01D 15/363* (2013.01); *B01J 20/165* (2013.01);
(Continued)

(58) Field of Classification Search
CPC ....... B01D 15/363; B01J 20/165; B01J 41/07; B01J 2220/80; H01M 10/0525; H01M 10/0568; H01M 10/0569
See application file for complete search history.

(56) References Cited

U.S. PATENT DOCUMENTS 6,033,808 A * 3/2000 Salmon ................. H01M 6/162
429/188
2008/0038639 A1* 2/2008 Ohata .................... H01M 4/139
429/231.95

(Continued)

FOREIGN PATENT DOCUMENTS

JP  11-185810  7/1999
JP  2003-45482  2/2003

(Continued)

OTHER PUBLICATIONS

"Removal of perfluoralkyl acids as common drinking water contaminants by weak base anion exchange resins: Impacts of solution pH and resin properties" by Kassar et al. in Water Research X, 17, 2022 p. 100159 (Year: 2022).*

(Continued)

*Primary Examiner* — Wyatt P McConnell
(74) *Attorney, Agent, or Firm* — GREENBLUM & BERNSTEIN, P.L.C.

(57) ABSTRACT

The apparatus for producing a non-aqueous electrolytic solution includes: a moisture adsorption apparatus accommodating zeolite through which an organic non-aqueous solvent passes, an electrolyte addition apparatus for adding an alkali metal salt electrolyte to the organic non-aqueous (Continued)

solvent treated by the moisture adsorption apparatus, and an acid adsorption apparatus accommodating a weakly basic anion exchange resin through which an alkali metal salt electrolyte-containing solution obtained by the electrolyte addition apparatus passes.

2 Claims, 3 Drawing Sheets

(51) Int. Cl.
*B01J 20/16* (2006.01)
*B01J 41/07* (2017.01)
*H01M 10/0525* (2010.01)
*H01M 10/0568* (2010.01)
*H01M 10/0569* (2010.01)

(52) U.S. Cl.
CPC ......... *B01J 41/07* (2017.01); *H01M 10/0525* (2013.01); *H01M 10/0568* (2013.01); *H01M 10/0569* (2013.01); *B01J 2220/80* (2013.01)

(56) References Cited

U.S. PATENT DOCUMENTS

| | | | |
|---|---|---|---|
| 2012/0141868 A1* | 6/2012 | Hirano | ............... B01J 20/186 |
| | | | 429/188 |
| 2012/0261328 A1 | 10/2012 | Shimada et al. | |
| 2016/0133992 A1* | 5/2016 | Voitl | ................. B01D 15/26 |
| | | | 429/188 |

FOREIGN PATENT DOCUMENTS

| | | |
|---|---|---|
| JP | 2011-71111 | 4/2011 |
| KR | 10-2012-103640 A | 9/2012 |
| WO | 2011/074631 | 6/2011 |

OTHER PUBLICATIONS

Office Action issued May 25, 2023 in Korean family member application No. 0-2021-7013122, and English language translation thereof.

Official Communication issued in International Patent Application No. PCT/JP2019/038123 dated Dec. 10, 2019, along with English-language translation.

* cited by examiner

APPARATUS FOR PRODUCING NON-AQUEOUS ELECTROLYTIC SOLUTION AND METHOD FOR PRODUCING NON-AQUEOUS ELECTROLYTIC SOLUTION

TECHNICAL FIELD

The present invention relates to an apparatus for producing a non-aqueous electrolytic solution and a method for producing a non-aqueous electrolytic solution.

BACKGROUND ART

In a lithium ion battery, a non-aqueous electrolytic solution made of a lithium-based electrolyte such as lithium hexafluorophosphate (LiPF$_6$) dissolved in an organic non-aqueous solvent is used as the electrolytic solution.

However, a small amount of moisture remains in the solvent and the lithium-based electrolyte to constitute the electrolytic solution, and the moisture reacts with the lithium-based electrolyte such as LiPF$_6$ to generate hydrogen fluoride (HF) and the like as shown, for example, in the following reaction formulas (1) to (3).

$$LiPF_6 + H_2O \rightarrow LiF + 2HF + POF_3 \quad (1)$$

$$POF_3 + H_2O \rightarrow POF_2(OH) + HF \quad (2)$$

$$POF_2(OH) + H_2O \rightarrow POF(OH)_2 + HF \quad (3)$$

The presence of acidic impurities such as hydrogen fluoride in the electrolytic solution tends to cause degradation of the battery capacity and charge/discharge cycle characteristics of a lithium-ion battery as well as corrosion inside the battery.

For this reason, a method for removing moisture and acidic impurities such as hydrogen fluoride from an electrolytic solution has been required. For example, in a method described in Patent Literature 1 (Japanese Patent Laid-Open No. 2011-71111), a method for removing moisture in a non-aqueous electrolytic solution with a zeolite is proposed, in which 97.5 mol % to 99.5 mol % of exchangeable cations are exchanged with lithium ions.

CITATION LIST

Patent Literature

Patent Literature 1

Japanese Patent Laid-Open No. 2011-71111

SUMMARY OF INVENTION

Technical Problem

According to the method described in Patent Literature 1, it is said that exchanging most of sodium ions in the zeolite with lithium ions allows the moisture in the electrolytic solution to be removed while preventing the elution of sodium ions into the electrolytic solution.

However, as a result of examination by the present inventors, it has been found that even in the method described in Patent Literature 1, a desired electrolytic solution cannot be prepared, because a certain amount of sodium ions remaining in zeolite are ion-exchanged with lithium ions in the non-aqueous electrolytic solution to elute into the non-aqueous electrolytic solution as impurities, and the electrolyte hinders the moisture removal by the zeolite.

Under such circumstances, an object of the present invention is to provide an apparatus for producing a non-aqueous electrolytic solution and a method for producing a non-aqueous electrolytic solution, capable of easily preparing a non-aqueous electrolytic solution having a reduced content of moisture with impurities such as sodium ions prevented from being mixed in, and a reduced content of acidic impurities such as hydrogen fluoride.

As a result of extensive studies to achieve the object by the present inventors, it has been found that by using an apparatus for producing a non-aqueous electrolytic solution having a moisture adsorption apparatus accommodating zeolite through which an organic non-aqueous solvent passes, an electrolyte addition apparatus for adding an alkali metal salt electrolyte to the organic non-aqueous solvent treated by the moisture adsorption apparatus, and an acid adsorption apparatus accommodating a weakly basic anion exchange resin through which an alkali metal salt electrolyte-containing solution obtained by the electrolyte addition apparatus passes, the above technical problems can be solved, so that the present invention has been completed based on the founding.

In other words, the present invention provides the following.

(1) An apparatus for producing a non-aqueous electrolytic solution comprising:
  a moisture adsorption apparatus accommodating zeolite through which an organic non-aqueous solvent passes,
  an electrolyte addition apparatus for adding an alkali metal salt electrolyte to the organic non-aqueous solvent treated by the moisture adsorption apparatus, and
  an acid adsorption apparatus accommodating a weakly basic anion exchange resin through which an alkali metal salt electrolyte-containing solution obtained by the electrolyte addition apparatus passes.

(2) The apparatus for producing a non-aqueous electrolytic solution according to item (1), wherein the content of the alkali metal in the organic non-aqueous solvent is 0 to 0.5 mol/L.

(3) The apparatus for producing a non-aqueous electrolytic solution according to item (1) or (2), wherein the acid adsorption-treated solution obtained from the acid adsorption apparatus has a moisture content of less than 10 mass ppm.

(4) The apparatus for producing a non-aqueous electrolytic solution according to any one of items (1) to (3), wherein the non-aqueous electrolytic solution is an electrolytic solution for a lithium ion battery.

(5) A method for producing a non-aqueous electrolytic solution, comprising:
  a moisture adsorption step of passing an organic non-aqueous solvent through zeolite,
  an electrolyte addition step of adding an alkali metal salt electrolyte to the organic non-aqueous solvent treated in the moisture adsorption step, and
  an acid adsorption step of passing an alkali metal salt electrolyte-containing solution obtained in the electrolyte addition step through a weakly basic anion exchange resin.

6) The method for producing a non-aqueous electrolytic solution according to item (5), wherein the content of the alkali metal in the organic non-aqueous solvent is 0 to 0.5 mol/L.

(7) The method for producing a non-aqueous electrolytic solution according to item (5) or (6), wherein the acid adsorption-treated solution obtained from the acid adsorption apparatus has a moisture content of less than 10 mass ppm.

(6) The method for producing a non-aqueous electrolytic solution according to any one of items (5) to (7), wherein the non-aqueous electrolytic solution is an electrolytic solution for a lithium ion battery.

Advantageous Effect of Invention

According to the present invention, an apparatus for producing a non-aqueous electrolytic solution and a method for producing a non-aqueous electrolytic solution, capable of easily preparing a non-aqueous electrolytic solution having a reduced moisture content with impurities including metal ions such as sodium ions prevented from being mixed in, and a reduced content of acidic impurities such as hydrogen fluoride, can be provided.

DESCRIPTION OF EMBODIMENT

An apparatus for producing a non-aqueous electrolytic solution of the present invention comprises a moisture adsorption apparatus accommodating zeolite through which an organic non-aqueous solvent passes, an electrolyte addition apparatus for adding an alkali metal salt electrolyte to an organic non-aqueous solvent treated by the moisture adsorption apparatus, and an acid adsorption apparatus accommodating a weakly basic anion exchange resin through which an alkali metal salt electrolyte-containing solution obtained by the electrolyte addition apparatus passes.

The apparatus for producing a non-aqueous electrolytic solution of the present invention is described appropriately with reference to drawing as follows.

Figure 1:
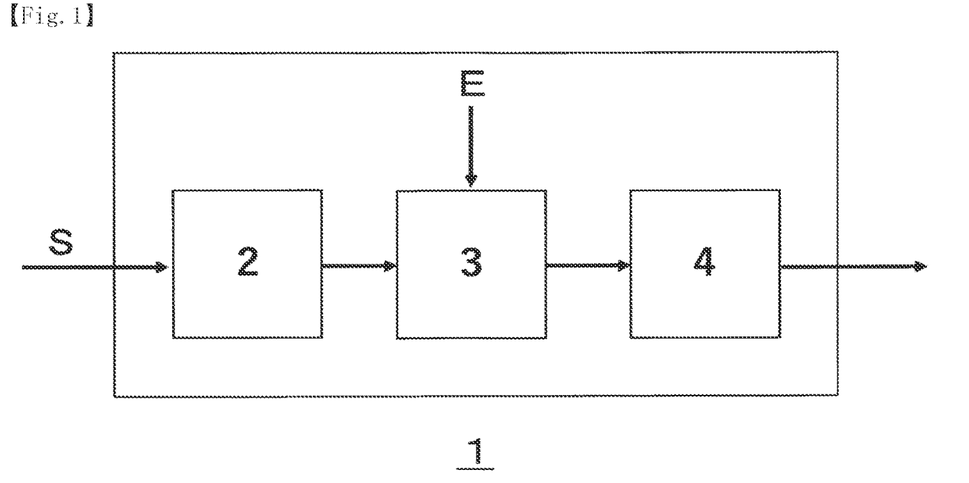
FIG. 1 is a chart illustrating the structure of an apparatus for producing a non-aqueous electrolytic solution of the present invention.

FIG. 1 is a chart illustrating an example of structure of an apparatus for producing a non-aqueous electrolytic solution of the present invention.

As shown in FIG. 1, an apparatus 1 for producing a non-aqueous electrolytic solution of the present invention comprises a moisture adsorption apparatus 2 accommodating zeolite through which an organic non-aqueous solvent S passes, an electrolyte addition apparatus 3 for adding an alkali metal salt electrolyte E to an organic non-aqueous solvent treated by the moisture adsorption apparatus 2, and an acid adsorption apparatus 4 accommodating a weakly basic anion exchange resin through which an alkali metal salt electrolyte-containing solution obtained by the electrolyte addition apparatus 3 passes.

In an apparatus for producing a non-aqueous electrolytic solution of the present invention, examples of the organic non-aqueous solvent include one or more selected from ethylene carbonate, propylene carbonate, dimethyl carbonate, diethyl carbonate, methyl ethyl carbonate, γ-butyrolactone, sulfolane, 1,2-dimethoxyethane, 1,2-diethoxyethane, 1,2-dibutoxyethane, and ethoxymethoxyethane.

In an apparatus for producing a non-aqueous electrolytic solution of the present invention, the content of an alkali, metal in an organic non-aqueous solvent is preferably 0 to 0.5 mol/L, more preferably 0 to 0.005 mol/L, still more preferably 0 to 0.00005 mol/L.

With a content of the alkali metal in an organic non-aqueous solvent in the range, the moisture can be effectively adsorbed with a moisture adsorption apparatus.

Incidentally, in the present application document, the alkali metal content means a value measured by atomic absorption spectrophotometry using an atomic absorption spectrophotometer (polarized Zeeman atomic absorption spectrophotometer ZA3000 manufactured by Hitachi High-Tech Corporation).

Examples of the zeolite accommodated in the moisture adsorption apparatus is not particularly limited as long as it can adsorb the moisture in an organic non-aqueous solvent, and examples thereof include one or more selected from crystalline zeolites.

Examples of the crystalline zeolites include one or more selected from A-type, Y-type, X-type, chabazite, ferrierite, ZSM-5, and clinoptilolite.

Further, it is preferable that the crystalline zeolites include Si and Al at a molar ratio Si/Al of 1 to 5. With a molar ratio Si/Al is the range, the zeolite has a stable structure and a moderate cation content to suitably adsorb and remove moisture.

The crystalline zeolite may be one with cations exchanged with lithium ions, calcium ions, etc., or may be one without exchange.

As described above, use of a crystalline zeolite ion-exchanged with lithium ions or the like in preparation of a non-aqueous electrolytic solution such as electrolytic solution for a lithium ion battery has been conventionally proposed to prevent elution of sodium ions from zeolite. Through studies of the present inventors, it has been found that in the case of treating an organic non-aqueous solvent, elution of sodium ions can be prevented without ion exchange of the cations (sodium ions) of a crystalline zeolite, and by treating the organic non-aqueous solvent instead of the electrolytic solution, the moisture can be effectively removed without hindering zeolite from removing the moisture by the electrolyte.

According to the present invention, therefore, by using a crystalline zeolite without ion exchange or with low-degree of ion exchange, an apparatus capable of producing a target electrolytic solution in a simple method at low cost can be easily provided.

The crystalline zeolite has a pore size of preferably 3 angstrom to 10 angstrom, more preferably 3 angstrom to 6 angstrom, still more preferably 3 angstrom to 4 angstrom.

With a pore size in the range, the crystalline zeolite is able to suitably adsorb and remove the moisture in an organic non-aqueous solvent.

Incidentally, in the present application document, the pore size means a theoretical value estimated from the crystal structure and the type of cations retained.

As the crystalline zeolite, one having a spherical shape or a cylindrical shape is preferred, and one having a diameter of 0.5 to 5 mm is preferred.

With a diameter in the range, the crystalline zeolite is able to be suitably impregnated with an organic non-aqueous solvent without degradation of handling properties.

In the apparatus for producing a non-aqueous electrolytic solution of the present invention, the accommodation aspect of the zeolite accommodated in a moisture adsorption apparatus is not particularly limited as long as the organic non-aqueous solvent comes into contact with the zeolite.

For example, the moisture adsorption apparatus may be a column or a tank filled with zeolite through which an organic non-aqueous solvent can pass.

Alternatively, the moisture adsorption apparatus may be equipped with a pump to make an organic non-aqueous solvent pass through.

In the apparatus for producing a non-aqueous electrolytic solution of the present invention, the liquid flow rate (liquid space velocity) of the organic non-aqueous solvent passing through zeolite may be appropriately selected from the rates at which the moisture in the organic non-aqueous solvent can be removed.

In the apparatus for producing a non-aqueous electrolytic solution of the present invention, a moisture adsorption apparatus adsorbs and removes the moisture in an organic non aqueous solvent before addition of an alkali metal salt electrolyte, instead in an electrolytic solution containing an alkali metal salt electrolyte.

As described above, the treatment of an organic non-aqueous solvent instead of an electrolytic solution enables the elution of metal ions in zeolite through ion exchange to be effectively prevented in adsorption of moisture by zeolite.

The apparatus for producing a non-aqueous electrolytic solution of the present invention may have a filtration apparatus on the latter stage (downstream side) of a moisture adsorption apparatus.

Since it is preferable that the filtration apparatus be installed immediately behind the moisture adsorption apparatus, the filtration apparatus is suitably installed between the moisture adsorption apparatus and an electrolyte addition apparatus as described below, and may be installed between an electrolyte addition apparatus and an acid adsorption apparatus as described below, or may be installed at the latter stage of an acid adsorption apparatus.

Having the filtration apparatus, the apparatus for producing a non-aqueous electrolytic solution of the present invention is able to suitably remove minute particles of zeolite in case of leaking out from the moisture adsorption apparatus.

It is preferable that the filtration apparatus have a filter material made of resin having fine pores, and examples the filter material made of resin include one or more filter materials selected from polyethylene, polypropylene, polytetrafluoroethylene, polyether sulfone, and polyamide.

The filter material having fine pores with a pore size of 0.01 to 10 μm on the surface is preferred, and one having fine pores with a pore size of 0.1 to 1 μm on the surface is more preferred.

The apparatus for producing a non-aqueous electrolytic solution of the present invention has an electrolyte addition apparatus for adding an alkali metal salt electrolyte to an organic non-aqueous solvent treated by the moisture adsorption apparatus.

In the apparatus for producing a non-aqueous electrolytic solution of the present invention, examples of the alkali metal salt electrolyte include a lithium based electrolyte. Examples of the lithium-based electrolyte include one or more selected from $LiPF_6$, $LiClO_4$, $LiBF_4$, $LiAsF_6$, $LiSbF_6$, $LiAlCl_4$ and $LiCF_3SO_3$, and $LiPF_6$ is preferred in view of battery performance.

In the apparatus for producing a non-aqueous electrolytic solution of the present invention, an electrolytic solution for a lithium-ion battery is suitable as the non-aqueous electrolytic solution.

In the apparatus for producing a non-aqueous electrolyte solution of the present invention, the electrolyte addition apparatus adds a lithium-based electrolyte to an organic non-aqueous solvent treated by the moisture adsorption apparatus, such that the concentration becomes preferably 0.5 to 2.0 mol/L, more preferably 0.5 to 1.2 mol/L, still more preferably 0.8 to mol/L.

In the electrolyte addition apparatus, is preferable that an alkali metal salt electrolyte-containing solution be prepared by adding an alkali metal salt electrolyte to a treated organic non-aqueous solvent under inert gas atmosphere.

In the apparatus for producing a non-aqueous electrolytic solution of the present invention, the electrolyte addition apparatus is not particularly limited as long as it has a flow channel of a treated organic non-aqueous solvent and means for adding an alkali metal salt electrolyte.

The electrolyte addition apparatus may be equipped with a pump to make the treated organic non-aqueous solvent pass through.

In the apparatus for producing a non-aqueous electrolytic solution of the present invention, the liquid flow rate (liquid space velocity) of the treated organic non-aqueous solvent passing through the electrolyte addition apparatus may be appropriately selected from the rates at which a desired amount of a lithium-based electrolyte can be added to the treated organic non-aqueous solvent.

In the apparatus for producing a non-aqueous electrolytic solution of the present invention, an alkali metal salt electrolyte may be added by passing the treated organic non-aqueous solvent obtained in the moisture adsorption apparatus through an electrolyte addition apparatus after storage in a tank or the like, or may be added by directly (consecutively) passing the treated organic non-aqueous solvent obtained in the moisture adsorption apparatus through an electrolyte addition apparatus.

Figure 2:
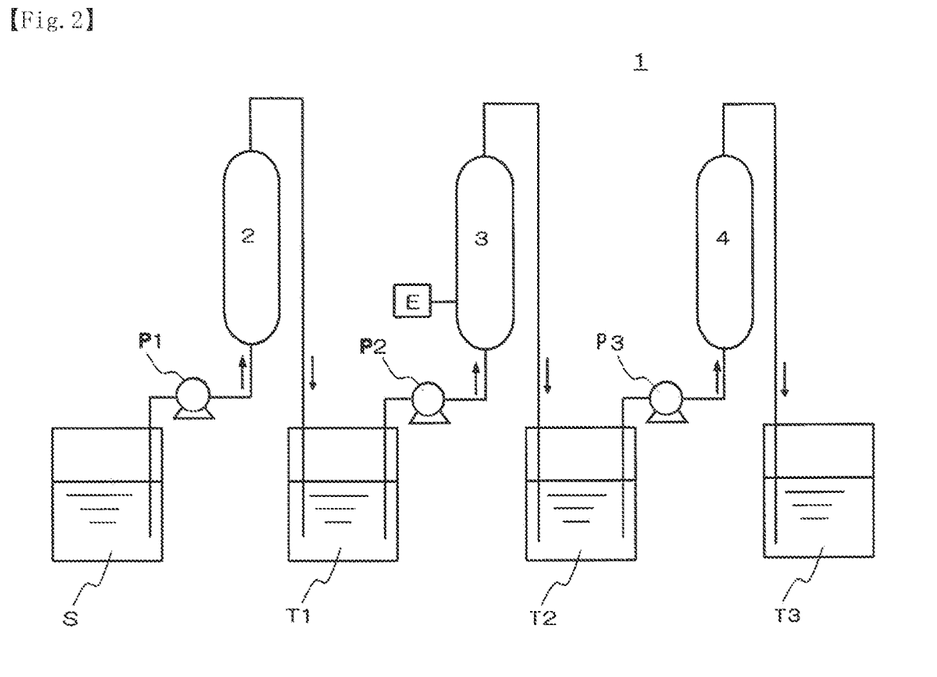
FIG. 2 is a chart showing an illustrative aspect of the apparatus for producing a non-aqueous electrolytic solution of the present invention.
Figure 3:
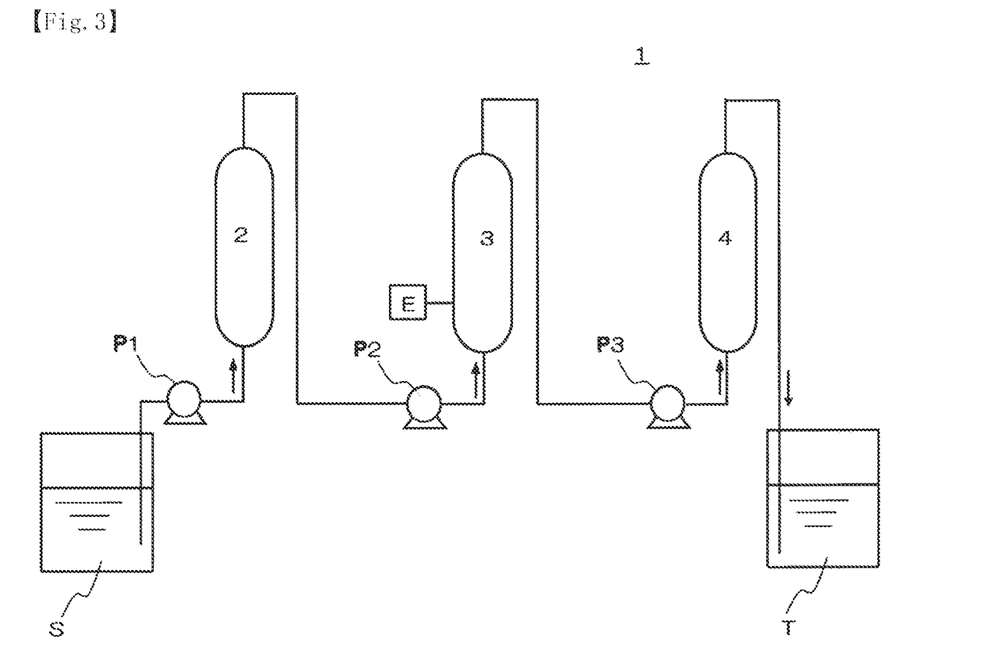
FIG. 3 is a chart showing an illustrative aspect of the apparatus for producing a non-aqueous electrolytic solution of the present invention.

In other words, as shown in FIG. 2, an organic non-aqueous solvent treated by passing an organic non-aqueous solvent S through a moisture adsorption apparatus 2 that accommodates zeolite by using a pump P1 is stored in a tank T1, and then passed through an electrolyte addition apparatus 3 by using a pump P2 for addition of an alkali metal salt electrolyte E. Alternatively, as illustrated in FIG. 3, the treated organic non-aqueous solvent obtained in a moisture adsorption apparatus 2 may be directly (consecutively) passed through an electrolyte addition apparatus 3 by using a pump P2 for addition of an alkali metal salt electrolyte E.

Figure 4:
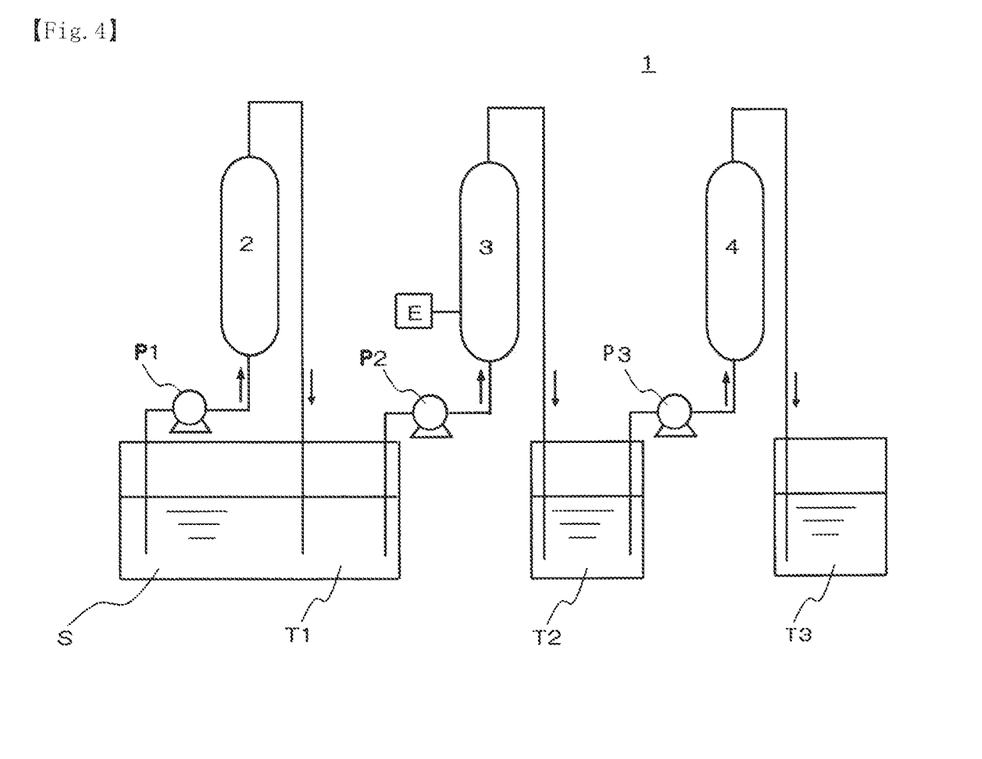
FIG. 4 is a chart showing an illustrative aspect of the apparatus for producing a non-aqueous electrolytic solution of the present invention.

Further, in another method, as illustrated in FIG. 4, an organic non-aqueous solvent S stored in a tank T1 is passed through a moisture adsorption apparatus 2 that accommodates zeolite by using a pump P1 to obtain a treated organic non-aqueous solvent, which is returned to the tank T1. The process is repeated several times to sufficiently remove the moisture in the organic non-aqueous solvent S. The resulting treated organic non-aqueous solvent is passed through an electrolyte addition apparatus 3 by using a pump P2 for addition of an alkali metal salt electrolyte E.

In the apparatus for producing a non-aqueous electrolytic solution of the present invention, the moisture in an organic non-aqueous solvent is adsorbed and removed with zeolite accommodated in a moisture adsorption apparatus in advance, and then an alkali metal salt electrolyte is added in an electrolyte addition apparatus. As a result, a non-aqueous electrolyte-containing solution having a reduced moisture content with impurities including metal ions such as sodium ions prevented from being mixed in, can be easily prepared.

The apparatus for producing a non-aqueous electrolytic solution of the present invention has an acid adsorption apparatus that accommodates a weakly basic anion exchange resin, through which an alkali metal salt electrolyte-containing solution obtained in the electrolyte addition apparatus is passed.

As the weakly basic anion exchange resin for use in the present invention, a known anion exchange resin may be used, and an organic polymer resin compound-based ion exchange resin is preferred.

Examples of the organic polymer resin compound-based ion exchange resin include those having a substrate (matrix) of styrene-based resin such as styrene-divinylbenzene copolymer, and those having a substrate of acrylic-based resin such as methacrylic acid-divinylbenzene copolymer and acrylic acid-divinylbenzene copolymer.

In the present application document, the styrene-based resin means a resin containing 50 mass % or more of structural units derived from styrene or a styrene derivative, obtained by homopolymerizing or copolymerizing styrene or a styrene derivative.

Examples of the styrene derivative include α-methylstyrene, vinyltoluene, chlorostyrene, ethylstyrene, i-propylstyrene, dimethylstyrene and bromostyrene.

The styrene-based resin may be a copolymer with another copolymerizable vinyl monomer as long as the resin contains a homopolymer or a copolymer of styrene or a styrene derivative as the main component. Examples the vinyl monomer include a polyfunctional monomers including a divinylbenzene such as o-divinylbenzene, m-divinylbenzene and p-divinylbenzene, an alkylene glycol di(meth)acrylate such as ethylene glycol di(meth)acrylate and polyethylene glycol di(meth)acrylate, and one or more selected from (meth)acrylonitrile, methyl (meth)acrylate, etc.

As the other copolymerizable vinyl monomer, ethylene glycol di(meth)acrylate, polyethylene glycol di(meth)acrylate having 4 to 16 polymerized ethylene units and divinylbenzene are more preferred, divinylbenzene and ethylene glycol di(meth)acrylate are still more preferred, and divinylbenzene is furthermore preferred.

In the apparatus for producing a non-aqueous electrolyte solution of the present invention, the ion exchange group constituting the weakly basic anion exchange resin is a weakly basic anion exchange group, which is preferably a primary to tertiary amino group, more preferably a tertiary amino group.

Examples of the weakly basic anion exchange group constituting the weakly basic anion exchange resin include a tertiary amino group represented by the following genera formula (I):

[Formula 1]

(I)

wherein $R^1$ and $R^2$ are hydrocarbon groups having 1 to 3 carbon atoms and may be the same or different from each other, and * represents a bonding site bonding with a substrate or a bonding group for bonding to a substrate.

In the weakly basic anion exchange group represented by the general formula (I), the group $R^1$ and the group $R^2$ are hydrocarbon groups having 1 to 3 carbon atoms.

Examples of the group $R^1$ and the group $R^2$ include one or more selected from an alkyl group and an alkenyl group, and an alkyl group is preferred.

Specific examples of the group $R^1$ and the group $R^2$ include one or more selected from a methyl group, an ethyl group, a propyl group, and a propylene group, and a methyl group is preferred.

In the weakly basic anion exchange group represented by the general formula (I), the group $R^1$ and the group $R^2$ may be the same or different from each other.

Examples of the weakly basic anion exchange group represented by the general formula (I) include a dimethylamino group, a diethylamino group, and a dipropylamino group, and a dimethylamino group is preferred.

In the general formula (I), * represents a bonding site between a weakly basic anion exchange group represented by the general formula (I) and a substrate or a bonding group for bonding with a substrate.

It is preferable that the weakly basic anion exchange group represented by the general formula (I) be appropriately bonded to a substrate made of styrene-based resin through a group $R^3$ group as bonding group, as shown in the following general formula (II).

[Formula 2]

(II)

wherein the group $R^1$ and the group $R^2$ are hydrocarbon groups having 1 to 3 carbon atoms, which may be the same or different, the $R^3$ is a hydrocarbon group having, 1 to 3 carbon atoms, and * represents a bonding site bonding with a substrate.

Examples of the group $R^1$ and the group $R^2$ include the same ones as in the above.

The group $R^3$ is a hydrocarbon group having 1 to 3 carbon atoms. Examples of the group $R^3$ include one or more selected from an alkylene group and an alkenylene group, and an alkylene group is preferred.

Specific examples of the group $R^3$ include one or more selected from a methylene group ($-CH_2-$), an ethylene group ($-CH_2CH_2CH_2-$), and a propylene group ($-CH_2CH_2CH_2-$), and a methylene group is preferred.

The weakly basic anion exchange group represented by the general formula (I) is introduced as a substituent into styrene or a styrene derivative, so that introduction into a styrene-based resin can be achieve.

The ion exchange resin may have a gel-type structure, a macroporous-type (MR-type) structure, or a porous-type structure.

Preferred examples of the weakly basic anion exchange resin for use in the present invention include those having a primary amino group or a secondary amino group as the ion exchange group, those having an amino group with a polyamine structure as the ion exchange group, and those having a substrate of styrene-based resin with a dimethylamino group as the ion exchange group. By using these weakly basic anion exchange resins, the content of acidic impurities such as hydrogen fluoride can be easily reduced.

The size of the weakly basic anion exchange resin is not particularly limited, and the harmonic mean diameter of the resin is preferably 300 to 1000 μm, more preferably 400 to 800 μm, still more preferably 500 to 700 μm.

The weakly basic anion exchange resin has a total ion exchange capacity in the we state of preferably 0.1 to 3.0 (eq/L-R), more preferably 0.5 to 2.5 (eq/L-R), still more preferably 1.0 to 2.0 (eq/L-R).

Such a weakly basic anion exchange resin may be a commercially available product, and examples thereof include one or more selected from DIAION WA30 manufactured by Mitsubishi Chemical Corporation and ORLITE DS-6 manufactured by Organo Corporation.

In the apparatus for producing a non-aqueous electrolytic solution of the present invention, the accommodation aspect of the weakly basic anion exchange resin accommodated in the acid adsorption apparatus is not particularly limited as long as the aspect allows the lithium-based electrolyte-containing solution obtained in the electrolyte addition apparatus to be brought into contact with the weakly basic anion exchange resin.

For example, the acid adsorption apparatus may be a column or tank filled with a weakly basic anion exchange resin through which an alkali metal salt electrolyte-containing solution can be passed.

Further, the acid adsorption apparatus may be equipped with a pump for passing an alkali metal salt electrolyte-containing solution.

In the apparatus for producing a non-aqueous electrolytic solution of the present invention, the liquid flow rate (liquid space velocity) of the alkali metal salt electrolyte-containing solution passing through the weakly basic anion exchange apparatus in the acid adsorption apparatus may be appropriately selected from the rates at which acidic impurities in the alkali metal salt electrolyte-containing solution can be removed.

In the apparatus for producing a non-aqueous electrolytic solution of the present invention, the alkali metal salt electrolyte-containing solution obtained in the electrolyte addition apparatus may be stored in a tank or the like and then passed through the acid adsorption apparatus that accommodates the weak basic anion exchange resin, or the alkali metal salt electrolyte-containing solution obtained in the electrolyte addition apparatus may be directly (consecutively) passed through the acid adsorption apparatus that accommodates the weakly basic anion exchange resin.

In other words, as illustrated in FIG. 2 and FIG. 4, an alkali metal salt electrolyte-containing solution obtained in an electrolyte addition apparatus 3 may be stored in a tank T2 and then passed through an acid adsorption apparatus 4 that accommodates a weakly basic anion exchange resin by using a pump P3, or as illustrated in FIG. 3, an alkali metal salt electrolyte-containing solution obtained in an electrolyte addition apparatus 3 may be directly (consecutively) passed through an acid adsorption apparatus 4 that accommodates a weakly basic anion exchange resin by using a pump P3.

The treatment by the weakly basic anion exchange resin may include, for example, the successive steps of washing a weakly basic anion exchange resin with an organic non-aqueous solvent that constitutes the alkali metal salt electrolyte-containing solution to be treated, drying the resin at about 40 to 80° C. under reduced pressure, swelling the weakly basic anion exchange resin with the organic non-aqueous solvent that constitutes the alkali metal salt electrolyte-containing solution to be treated again, and filling a column with the resin. Then, after performing backwashing, extrusion, etc., according to the conventional method, a step of passing the electrolytic solution to be treated is performed at an SV (flow rate/ion exchange resin volume ratio) of preferably 1 to 100 $hr^{-1}$, more preferably at an SV of 2 to 50 $hr^{-1}$, still more preferably at an SV of 5 to 20 $hr^{-1}$.

In the apparatus for producing an electrolytic solution for a lithium ion battery of the present invention, it is preferable that the moisture content in the acid adsorption-treated solution obtained from the acid adsorption apparatus be less than 10 mass ppm.

In the present application document, the moisture content means a value measured by Karl-Fischer method.

In the apparatus for producing a non-aqueous electrolytic solution of the present invention, an alkali metal salt electrolyte is added in an electrolyte addition apparatus after the moisture in an organic non-aqueous solution is adsorbed and removed in advance by zeolite accommodated in a moisture adsorption apparatus, so that an acid adsorption-treated solution with a reduced moisture content can be prepared with impurities including metal ions such as sodium ions prevented from being mixed in.

In the apparatus for producing a non-aqueous electrolytic solution of the present invention, the content of acidic impurities such as hydrogen fluoride in the acid adsorption-treated solution obtained from the acid adsorption apparatus is preferably 20 mass ppm or less, more preferably 10 mass ppm or less, still more preferably 5 mass ppm or less.

Incidentally, in the present application document, the amount of acidic impurities means the value measured by neutralization titration method.

In the apparatus for producing a non-aqueous electrolytic solution of the present invention, a target non-aqueous electrolytic solution may be obtained directly from the acid adsorption-treated solution obtained from the acid adsorption apparatus, or may be obtained through an appropriate known purification treatment.

Examples of the non-aqueous electrolytic solution include an electrolytic solution selected from an electrolytic solution for a lithium ion battery, an electrolytic solution for a sodium ion battery, and an electrolytic solution for a potassium ion battery.

In the apparatus for producing a non-aqueous electrolytic solution of the present invention, the moisture in an organic non-aqueous solvent (generation source of acidic impurities) is adsorbed and removed by zeolite accommodated in a moisture adsorption apparatus in advance, an alkali metal salt electrolyte is then added in an electrolyte addition apparatus, and further, acidic impurities are removed by an acid adsorption apparatus that accommodates a weakly basic anion exchange resin.

In the apparatus for producing a non-aqueous electrolytic solution of the present invention, therefore, a non-aqueous electrolytic solution with a reduced content of acidic impurities such as hydrogen fluoride can be easily prepared.

According to the present invention, an apparatus for producing a non-aqueous electrolytic solution capable of easily preparing an electrolytic solution having a reduced moisture content with impurities such as sodium ions prevented from being mixed in, and a reduced content or acidic impurities such as hydrogen fluoride, can be provided.

Next, a method for producing a non-aqueous electrolytic solution of the present invention is described.

The method for producing a non-aqueous electrolytic solution of the present invention comprises:
  a moisture adsorption step of passing an organic non-aqueous solvent through zeolite, an electrolyte addition step of adding an alkali metal salt electrolyte to the organic non-aqueous solvent treated in the moisture adsorption step, an acid adsorption step of passing an alkali metal salt electrolyte-containing solution obtained in the electrolyte addition step through a weakly basic anion exchange resin.

Since the method for producing a non-aqueous electrolytic solution of the present invention is practically a method for producing a non-aqueous electrolytic solution by using the production apparatus of the present invention, the details are common to the production method and the usage of the production apparatus of the present invention.

According to the present invention, a method for producing a non-aqueous electrolytic solution capable of easily preparing an electrolytic solution having a reduced moisture content with impurities including metal ions such as sodium ions prevented from being mixed in, and a reduced content of acidic impurities such as hydrogen fluoride, can be provided.

EXAMPLES

Next, the present invention is described in more detail with reference to Examples, which are provided for exemplifying purposes and not intended to limit the present invention.

Example 1

An electrolytic solution was prepared by using an apparatus 1 for producing an electrolytic solution for a lithium ion battery shown in FIG. 2.

In other words, as shown in FIG. 2, an organic non-aqueous solvent S obtained by mixing ethylene carbonate and dimethyl carbonate at a volume ratio of 1:1 (moisture content: 50 mass ppm, sodium content: less than 1 mass ppm) was passed through a moisture adsorption apparatus 2 that accommodates crystalline type-A zeolite (having 98 mol % or more of Na ions exchanged with Li ions) at a liquid flow rate of 20 (L/L-zeolite)/h, by using a pump P1 so as to obtain treated organic non-aqueous solvent, which was then stored in a tank T1.

Next, the treated organic non-aqueous solvent in the tank T2 was passed through the electrolyte addition apparatus 3 by using the pump P2, and LiPF$_6$ as a lithium-based electrolyte was added thereto to a concentration of 1 mol/L. The resulting lithium-based electrolyte-containing solution was stored in a tank T2.

The solution was then passed through an acid adsorption apparatus 4 accommodating a weakly basic anion exchange resin (MR-type anion exchange resin having a styrene-based resin as matrix and a dimethylamine group as weakly basic anion exchange group) at a liquid flow rate of 10 (L/L-zeolite)/h by using a pump P3 so as to obtain an electrolytic solution for a lithium ion battery. The resulting electrolytic solution for a lithium on battery was stored in a tank T3.

Example 2

An electrolytic solution was prepared by using an apparatus 1 for producing an electrolytic solution for a lithium ion battery shown in FIG. 4.

In other words, as shown in FIG. 4, an organic non-aqueous solvent S obtained by mixing ethylene carbonate and dimethyl carbonate at a volume ratio of 1:1 (moisture content: 50 mass ppm, sodium content: less than 1 mass ppm) was passed through a moisture adsorption apparatus 2 that accommodates crystalline type-A zeolite (having 98 mol % or more of Na ions exchanged with Li ions) at a liquid flow rate of 80 (L/L-zeolite)/h for 2 hours, by using a pump P1 so as to obtain a sufficiently treated organic non-aqueous solvent, which was then stored in a tank.

Next, the treated organic non-aqueous solvent in the tank T1 was passed through the electrolyte addition apparatus 3 by using a pump P2, and LiPF$_6$ as a lithium-based electrolyte E was added thereto to a concentration of 1 mol/L. The resulting lithium-based electrolyte-containing solution was stored in a tank T2.

The solution was then passed through an acid adsorption apparatus 4 accommodating a weakly basic anion exchange resin (MR-type anion exchange resin having a styrene-based resin as matrix and a dimethylamine group as weakly basic anion exchange group) at a liquid flow rate of 10 (L/L-zeolite)/h by using a pump P3 so as to obtain an electrolytic solution for a lithium ion battery. The resulting electrolytic solution for a lithium ion battery was stored in a tank T3.

Example 3

An electrolytic solution for a lithium ion battery was prepared and stored in a tank T3 by the same method as in Example 2, except that the zeolite accommodated in a moisture adsorption apparatus 2 was changed from the crystalline type-A zeolite (having 98 mol % or more of Na ions exchanged with Li ions) to a crystalline type-A zeolite (having 98 mol % or more of Na ions exchanged with Ca ions).

Example 4

An electrolytic solution for a lithium ion battery was prepared and stored in a tank T3 by the same method as in Example 2, except that the zeolite accommodated in a moisture adsorption apparatus 2 was changed from the crystalline type-A zeolite (having 98 mol % or more of Na ions exchanged with Li ions) to a crystalline type-A zeolite (having 98 mold or more exchanged with Na ions).

Comparative Example 1

An electrolytic solution for a lithium ion battery was prepared by the same method as in Example 1, except that treatment by the moisture adsorption apparatus and the treatment by the electrolyte addition apparatus were interchanged.

Figure 5:
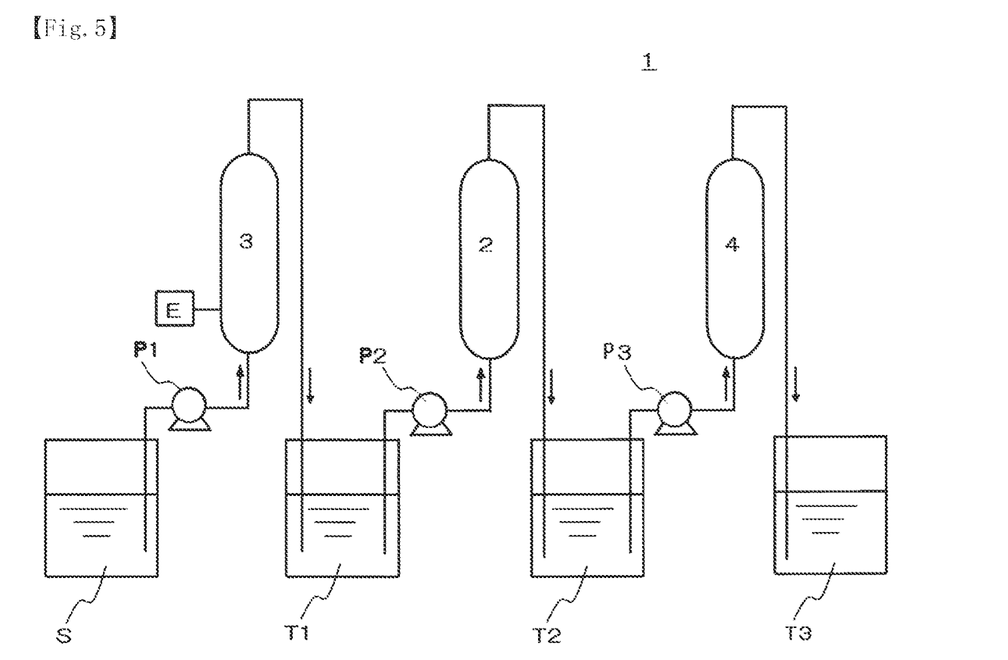
FIG. 5 is a chart showing an aspect of the apparatus for producing a non-aqueous electrolytic solution in Comparative Example of the present invention.

In other words, as shown in FIG. 5, an organic non-aqueous solvent S obtained by mixing ethylene carbonate and dimethyl carbonate at a volume ratio of 1:1 (moisture content: 50 mass ppm, sodium content: less than 1 mass ppm) was passed through an electrolyte addition apparatus 3 by using a pump P1, and LiPF$_6$ as a lithium-based electrolyte E was added thereto to a concentration of 1 mol/L. The resulting lithium-based electrolyte-containing solution was stored in a tank T1.

Next, a solution treated by passing the lithium-based electrolyte-containing solution stored in the tank T1 through a moisture adsorption apparatus 2 that accommodates crystalline type-A zeolite (having 98 mol % or more of Na ions exchanged with Li ions) at a liquid flow rate of 20 (L/L-zeolite)/h by using a pump P2 was stored in a tank T2.

The treated solution in the tank T2 was then passed through an acid adsorption apparatus 4 accommodating a weakly basic anion exchange resin (MR-type anion exchange resin having a styrene-based resin as matrix and a dimethylamine group as weakly basic anion exchange group) at a liquid flow rate of 10 (L/L-zeolite)/h by using a pump P3 so as to obtain an electrolytic solution for a lithium ion battery. The resulting electrolytic solution for a lithium ion battery was stored in a tank T3.

The hydrogen fluoride content (mass ppm), the moisture content (mass ppm), and the sodium content (mass ppm) in each of the electrolytic solution for a lithium-ion battery obtained in Examples 1 to 4 and Comparative Example 1 were measured. The results are shown in Table 1.

As shown in Table 1, in Examples 1 to 4, an apparatus for producing an electrolytic solution for a lithium ion battery, treated an organic non-aqueous solvent by using a moisture adsorption apparatus accommodating zeolite, an electrolyte addition apparatus for adding a lithium-based electrolyte, and an acid adsorption apparatus accommodating a weakly basic anion exchange resin, through which the solution was passed in this order. The resulting electrolytic solution, therefore, had a moisture content of less than 10 mass ppm, a hydrogen fluoride content of less than 10 mass, a sodium content of less than 1 ppm by mass, which were sufficiently reduced. It has been therefore found that an electrolytic solution having a reduced moisture content with impurities including sodium ions prevented from being mixed in and a reduced content of acidic impurities such as hydrogen fluoride can be easily prepared.

In addition, in Example 2, Example 3 and Example 4 in comparison with Example 1, the liquid flow rate passing through the moisture adsorption apparatus 2 may be increased to reduce the moisture content in the organic non-aqueous solvent through circulation operation, so that it has been found that the apparatus for producing an electrolytic solution for a lithium ion battery can be downsized and the working time can be shortened.

Furthermore, it has been found that in Example 3 and Example 4 in comparison with Example 1 and Example 2, even with use of an inexpensive Ca-exchanged product or Na-exchanged product instead of an expensive Li-exchanged product as crystalline zeolite, high-quality electrolytic solutions equivalent to those in Examples 1 and 2 can be obtained at low cost.

On the other hand, it has been found from Table 1, that in Comparative Example 1, due to interchange of the sequence of the treatment by the moisture adsorption apparatus and the treatment by the electrolyte addition apparatus from Example 1, merely an electrolytic solution having a large moisture content of 24 mass ppm and a large sodium content of 7 mass ppm was obtained. The reason is presumed that the sodium was eluted from the zeolite and the moisture removal by the zeolite was hindered by the electrolyte, so that the moisture was not effectively removed.

INDUSTRIAL APPLICABILITY

According to the present invention, an apparatus for producing a non-aqueous electrolytic solution and a method for producing a non-aqueous electrolytic solution, capable of easily preparing a non-aqueous electrolytic solution having a reduced moisture content with impurities including metal ions such as sodium ions prevented from being mixed in, and a reduced content of acidic impurities such as hydrogen fluoride, can be provided.

REFERENCE SIGNS LIST

1: APPARATUS FOR PRODUCING ELECTROLYTIC SOLUTION FOR LITHIUM ION BATTERY
2: MOISTURE ADSORPTION APPARATUS
3: ELECTROLYTE ADDITION APPARATUS
4: ACID RESORPTION APPARATUS

The invention claimed is:

1. A system for producing a non-aqueous electrolytic solution comprising:
an organic non-aqueous solvent,
a moisture adsorption apparatus accommodating a Ca-exchanged crystalline zeolite through which the organic non-aqueous solvent passes,
an electrolyte addition apparatus for adding an alkali metal salt electrolyte to the organic non-aqueous solvent treated by the moisture adsorption apparatus, and
an acid adsorption apparatus accommodating an anion exchange resin through which an alkali metal salt electrolyte-containing solution obtained by the electrolyte addition apparatus passes; wherein
the content of the alkali metal in the organic non-aqueous solvent is 0 to 0.005 mol/L;
the organic non-aqueous solvent comprises a carbonate ester;
the anion exchange resin has a substrate of styrene-based resin and has tertiary amino groups represented by general formula (I) and general formula (II):

where $R^1$ and $R^2$ are hydrocarbon groups having 1 to 3 carbon atoms and may be the same or different from each other, and * represents a bonding site bonding with the substrate,

TABLE 1

|  | Example 1 | Example 2 | Example 3 | Example 4 | Comparative Example 1 |
|---|---|---|---|---|---|
| Hydrogen fluoride (mass ppm) | <10 | <10 | <10 | <10 | <10 |
| Moisture (mass ppm) | <10 | <10 | <10 | <10 | 24 |
| Sodium (mass ppm) | <1 | <1 | <1 | <1 | 7 |

* In the table, "<10" means less than 10 mass ppm, and "<1" means less than 1 mass ppm.

the anion exchange resin has a substrate of styrene-based resin and has tertiary amino groups represented by general formula (I) and general formula (II):

(I)

where $R^1$ and $R^2$ are hydrocarbon groups having 1 to 3 carbon atoms and may be the same or different from each other, and * represents a bonding site bonding with the substrate, (II)

where $R^1$ and $R^2$ are hydrocarbon groups having 1 to 3 carbon atoms, which may be the same or different from each other, $R^3$ is a hydrocarbon group having 1 to 3 carbon atoms, and * represents a bonding site bonding with the substrate; and the Ca-exchanged crystalline zeolite through which the organic non-aqueous solvent passes is a Ca-exchanged crystalline zeolite having 98 mol % or more of Na ions exchanged with Ca ions.

(II)

where $R^1$ and $R^2$ are hydrocarbon groups having 1 to 3 carbon atoms, which may be the same or different from each other, $R^3$ is a hydrocarbon group having 1 to 3 carbon atoms, and * represents a bonding site bonding with the substrate; and the Ca-exchanged crystalline zeolite through which the organic non-aqueous solvent passes is a Ca-exchanged crystalline zeolite having 98 mol % or more of Na ions exchanged with Ca ions.

2. A method for producing a non-aqueous electrolytic solution, comprising:

passing an organic non-aqueous solvent through a Ca-exchanged crystalline zeolite, adding an alkali metal salt electrolyte to the organic non-aqueous solvent treated during the passing of the organic non-aqueous solvent through the Ca-exchanged crystalline zeolite, and passing an alkali metal salt electrolyte-containing solution obtained during the adding of the alkali metal salt electrolyte to the organic non-aqueous solvent through an anion exchange resin; wherein the content of the alkali metal in the organic non-aqueous solvent is 0 to 0.005 mol/L;

the organic non-aqueous solvent comprises a carbonate ester;

* * * * *